United States Patent [19]
Van Exel et al.

[11] 3,829,194

[45] Aug. 13, 1974

[54] BINOCULAR

[75] Inventors: Gerrit A. Van Exel, Fullerton; Alfred A. Akin, Jr., West Covina, both of Calif.

[73] Assignee: Bausch & Lomb Incorporated, Rochester, N.Y.

[22] Filed: Jan. 15, 1973

[21] Appl. No.: 323,918

[52] U.S. Cl........................... 350/76, 350/36, 350/65
[51] Int. Cl. ............................................. G02b 7/12
[58] Field of Search .............................. 350/75–77, 350/36, 46, 47, 65, 82

[56] References Cited
UNITED STATES PATENTS

| | | | |
|---|---|---|---|
| 1,967,738 | 7/1934 | Boydston | 350/76 |
| 2,436,574 | 2/1948 | Johanson | 350/76 |
| 2,436,576 | 2/1948 | Kende et al. | 350/72 |
| 3,434,772 | 3/1969 | Fogle | 350/76 X |
| 3,540,792 | 11/1970 | Akin | 350/76 X |

FOREIGN PATENTS OR APPLICATIONS

| | | | |
|---|---|---|---|
| 256 | 1900 | Great Britain | 350/75 |
| 28,027 | 0/1903 | Great Britain | 350/75 |
| 12,197 | 0/1906 | Great Britain | 350/77 |
| 135,752 | 12/1919 | Great Britain | 350/76 |
| 367,052 | 1/1923 | Germany | 350/76 |
| 428,456 | 5/1926 | Germany | 350/65 |

*Primary Examiner*—David H. Rubin
*Attorney, Agent, or Firm*—Christie, Parker & Hale

[57] ABSTRACT

A binocular having a pair of monoculars with identical frames for supporting prisms, eyepieces, and objective lenses. The frames are coupled by a sliding connection to permit linear adjustment of eyepiece interpupillary spacing by a rotary knob and gear system. The mated monoculars are supported in an outer housing which eliminates need for a conventional storage case. A singed brow bar on the housing rests against the user's forehead to steady the binocular during viewing, and the brow bar covers the eyepieces when the binocular is not in use. Focussing is achieved by moving field lenses in the eyepiece optical systems to maintain a constant eyepoint compatible with use of the brow bar.

13 Claims, 23 Drawing Figures

3,829,194

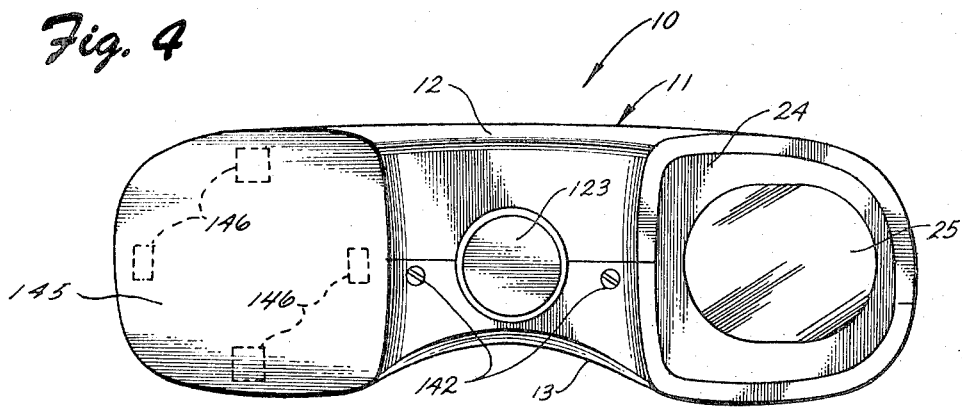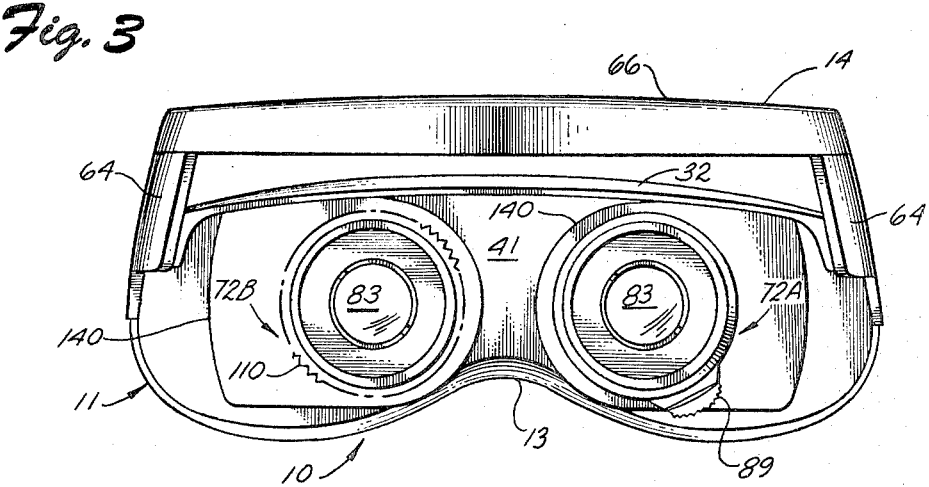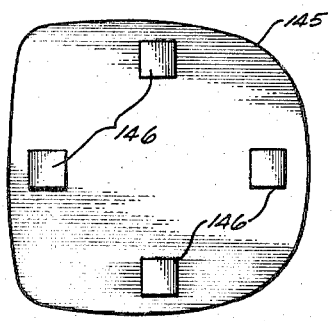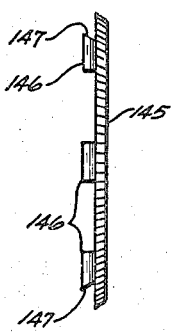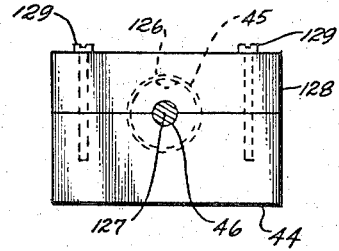

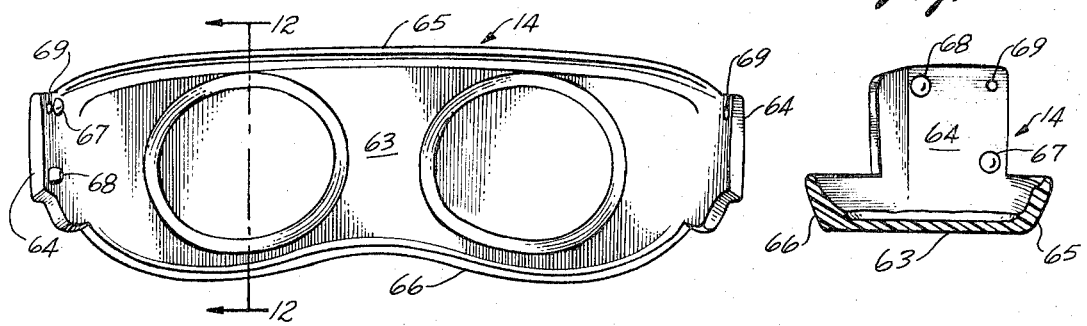
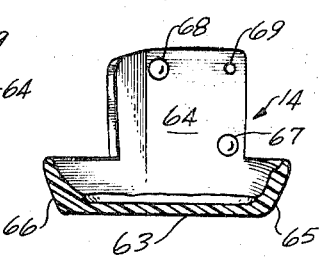
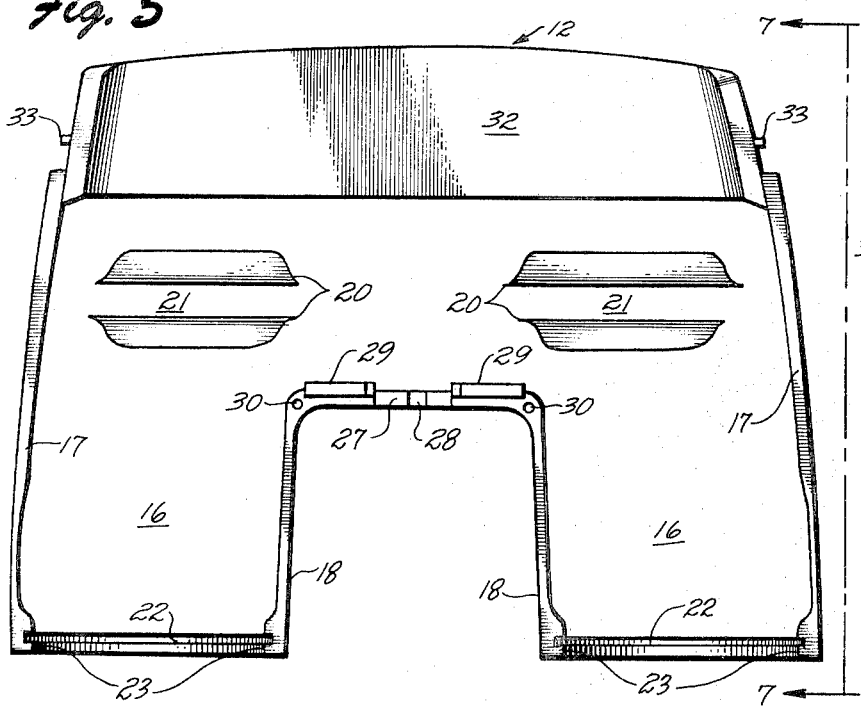
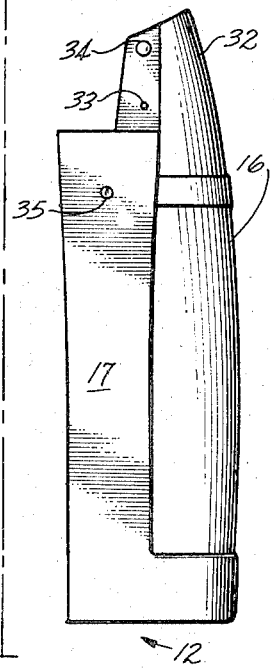
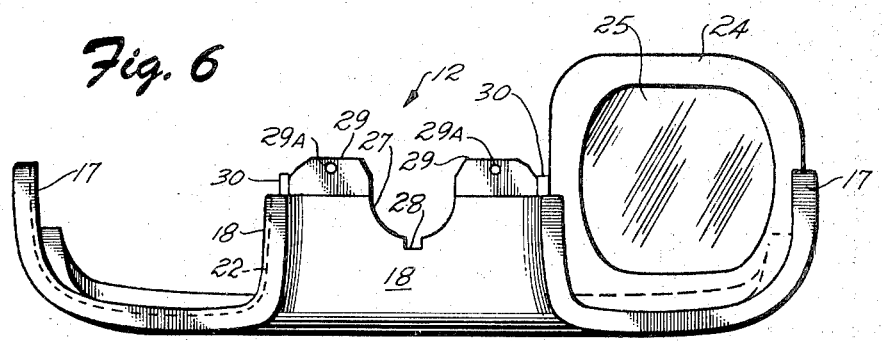

BINOCULAR

BACKGROUND OF THE INVENTION

Conventional prism binoculars typically are made by mounting the various optical components on rigid frame members which are part of the binocular housing or outer shell. The housing usually comprises a pair of hinged halves which are movable pivotally about a central axis for adjustment of interpupillary spacing of the monocular eyepieces. These conventional instruments are quite satisfactory in many respects, but are expensive to manufacture and maintain due to complex, time-consuming collimation and alignment adjustments which must be made by skilled optical technicians after assembly is complete.

The binocular of this invention is an innovation which abandons many traditional design features and takes a fresh approach resulting in simplified manufacturing procedures with no sacrifice in optical quality or operating convenience. The new design is in fact easier to use than conventional binoculars, and is both rugged and attractive. The need for a conventional storage case is eliminated, and a novel hinged brow bar stabilizes the binoculars during use and provides protection for eyepiece surfaces during storage.

Monocular telescopes for the binocular are assembled on identical skeletal frames, and optical alignment is accomplished while the optical components are readily acessible prior to final assembly. Tooling costs are reduced because identical frames are used in both monoculars, and tooling duplication to make "right" and "left" allochiral parts is avoided. A "linear hinge" connection of the monoculars for interpupillary-spacing adjustment permits use of a rigid housing for the binocular, and simplifies optical alignment because the monoculars do not pivot about a central axis as in conventional designs.

SUMMARY OF THE INVENTION

Briefly stated, the binocular of this invention includes a pair of monocular telescopes, and a coupling means for connecting the two telescopes to be linearly laterally movable with respect to each other for adjustment of interpupillary spacing. A rigid outer housing is fitted over the telescopes, and the housing includes a guide means engaged with the telescopes and permitting lateral movement thereof within the stationary housing during interpupillary-spacing adjustment. Preferably, each telescope includes a frame having a prism-supporting base, and eyepiece and objective-lens housings extending from opposite sides of the base. The two frames are substantially identical, and are oppositely positioned within the housing in contrast to the symmetrical positioning used in conventional instruments.

In a preferred form, the coupling means which connects the telescopes includes a pair of coupling pins, each pin being secured to a respective frame and making a slip fit in a bore or socket in the other frame. The coupling means further includes an adjustment means for varying the lateral spacing of the telescopes to modify the interpupillary spacing of the telescopes.

In a preferred form, the binocular includes a brow bar and eyepiece cover which is anatomically contoured to fit against the user's forehead when the cover is opened to a viewing position. The cover is pivotally mounted on the binocular housing, and extends over the eyepiece housings to protect the associated lenses when in a closed storage position. To maintain a constant eyepoint and thereby eliminate the need for spacing adjustments on the brow bar, focusing of the ocular lens is achieved by incorporating a movable field lens between the eyepiece lens and reflecting prisms used in the telescope optical system. Preferably, the field lenses are connected by a pair of bridge members which drive the two field lenses in synchronism during focusing. The bridge members are connected by means which provide limited lateral freedom of the members with respect to each other to enable adjustment of the interpupillary spacing of the telescopes.

DESCRIPTION OF THE DRAWINGS

FIG. 3 is a rear elevation of the binocular with the brow bar in an open position;

FIG. 4 is a front elevation of the binocular;

FIG. 5 is a plan view showing the inside surface of an upper housing shell;

FIG. 6 is a front view of the upper shell;

FIG. 7 is a side view of the upper shell on line 7—7 of FIG. 5;

FIG. 11 is a plan view of the inside surface of a brow bar;

FIG. 12 is a section of the brow bar on line 12—12 of FIG. 11;

FIG. 21 is an enlarged elevation on line 21—21 of FIG. 19;

FIG. 22 is elevation of the inside surface of a removable objective cover plate for the binocular; and FIG. 23 is a side elevation of the cover plate.

DESCRIPTION OF THE PREFERRED EMBODIMENT

Figure 1:
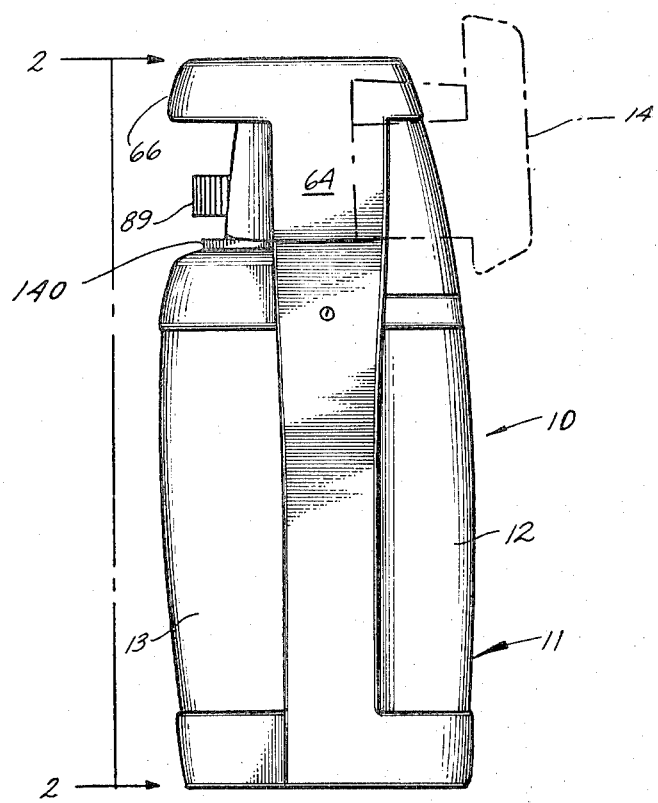
FIG. 1 is a side elevation of a binocular according to the invention, with a brow bar in a closed position in solid line, and an open position in phantom line.
Figure 2:
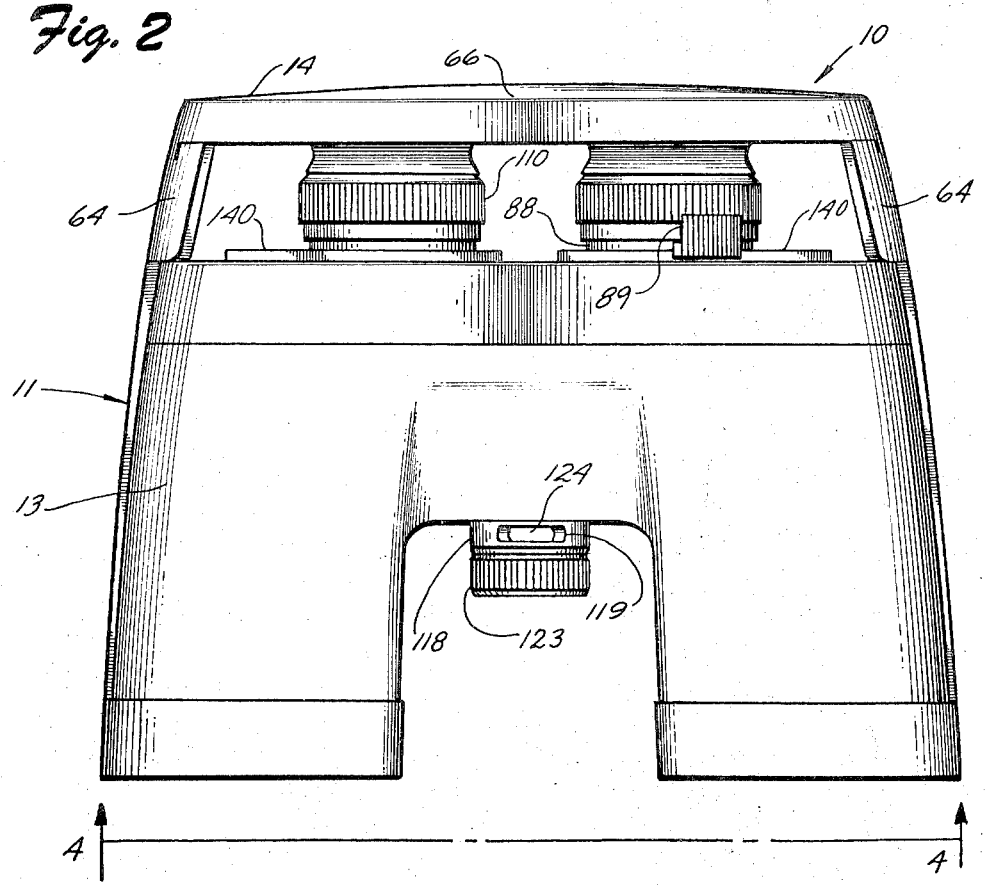
FIG. 2 is a bottom plan view of the binocular.

A binocular 10 according to the invention is shown in FIGS. 1–4, and includes an outer housing 11 which supports and protects the optical components of the instrument. Housing 11 is a hollow enclosure formed by an upper shell 12, lower shell 13, and an eyepiece-cover brow bar 14 pivotally mounted on the upper shell.

Upper housing shell 12 is shown in detail in FIGS. 5–7, and is an integrally molded component comprising a top wall 16, a pair of side walls 17, and a generally U-shaped center wall 18. Two pairs of ridges 20 extend from the inner surfaces of top wall 16, and each pair of ridges defines a seat or channel 21 therebetween in which the monocular telescopes of the binocular are slidably fitted during assembly.

The front ends of wall 16, 17 and 18 define a pair of grooves 22 with inwardly beveled forward peripheral edges 23. A pair of objective-lens cover panels 24 (only one of which is shown in FIG. 6) have transparent center portions 25, and the panels are seated in grooves 22 of the upper housing shell.

A semi-circular opening 27 with an index notch 28 is centrally positioned in center wall 18, and a pair of tabs 29 extend from the end of the center wall on opposite sides of opening 27. Each tab 29 has a threaded opening 29A therethrough. A pair of locating pins 30 also extend from the end of the center wall adjacent tabs 29.

The rear ends of side walls 17 are reduced in height to form an eyepiece shield 32 with the rear end of top wall 16. A pair of pins 33 extend from opposite sides of the eyepiece shield, and a detent socket 34 is formed in the shield adjacent one of the pins. A hole 35 is formed in each side wall 17 forwardly of the eyepiece shield, and anchors for a carrying strap (not shown) are mounted through these holes to be secured to the upper shell.

Figure 8:
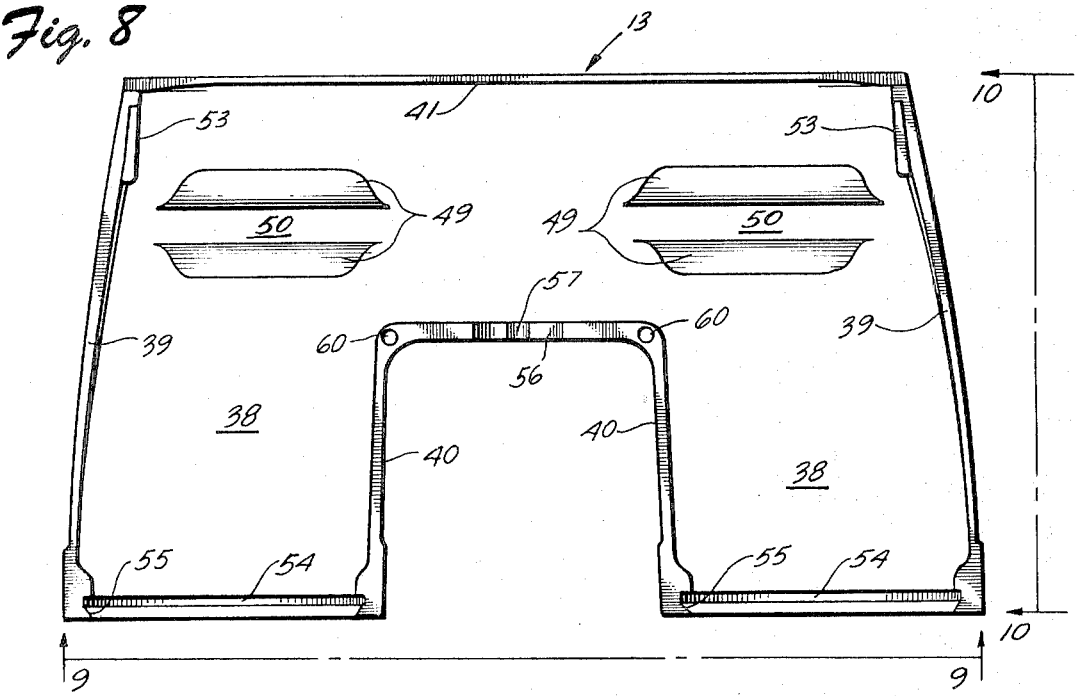
FIG. 8 is a plan view showing the inside surface of a lower housing shell.
Figure 10:
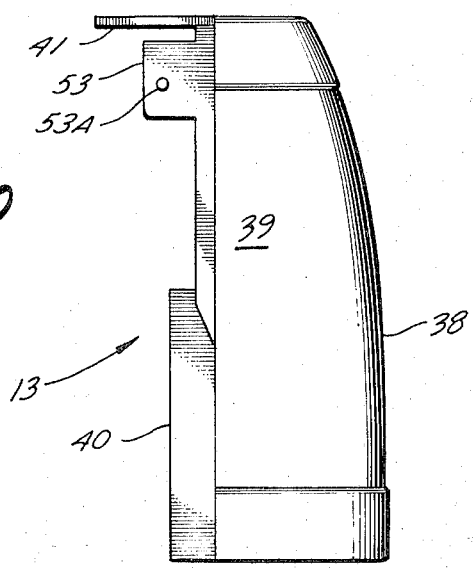
FIG. 10 is a side view of the lower shell on line 10—10 of FIG. 8.
Figure 9:
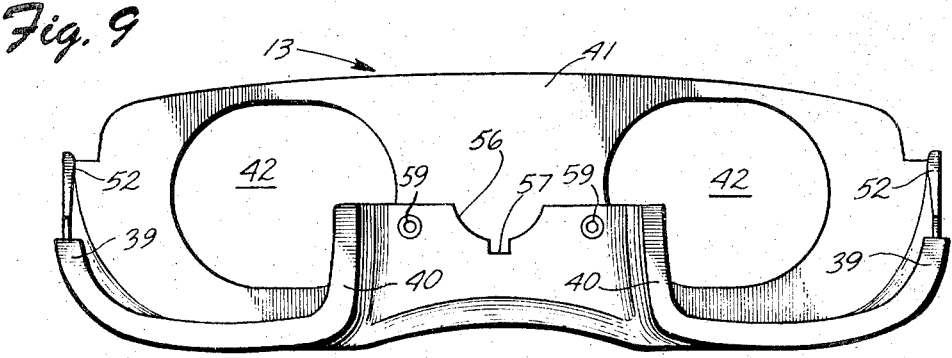
FIG. 9 is a front view of the lower shell.
Figure 13:
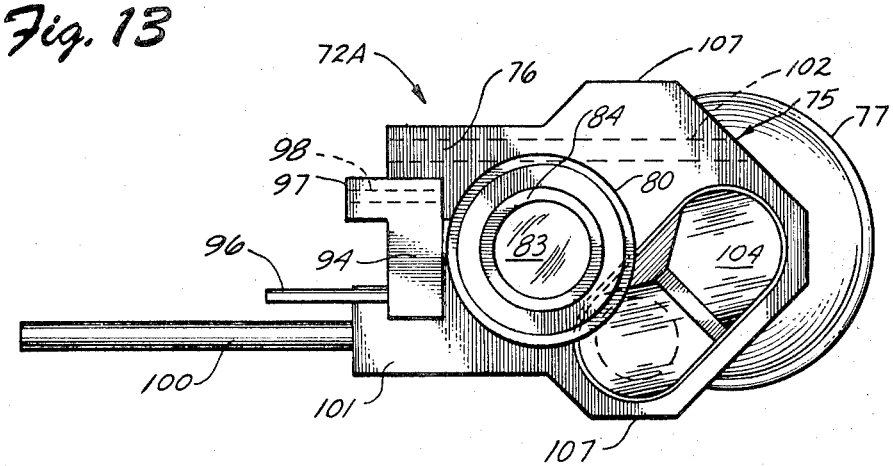
FIG. 13 is a rear elevation of a monocular telescope.

Lower shell 13 is shown in detail in FIGS. 8–10, and is formed to mate with upper shell 12 when the binocular is assembled. The lower shell includes a bottom wall 38 having upwardly extending sidewalls 39 and a generally U-shaped center wall 40. A rear wall 41 extends upwardly from the rear end of bottom wall 38 between sidewalls 39. The rear wall extends substantially above the sidewalls to form a rear closure for the binocular housing. A pair of oblong eyepiece openings 42 are formed through the rear wall.

A boss 44 is integrally formed on the inner surface of rear wall 41 between eyepiece openings 42. A pocket 45 is formed in the center of the boss, and a semi-circular opening 46 extends from pocket 45 to the forward surface of the boss. A pair of threaded openings 47 extend into the boss on opposite sides of pocket 45. Boss 45 forms a saddle to receive and support one end of a shaft (described below) used to adjust interpupillary spacing of the binocular eyepieces.

Two pairs of ridges 49 extend from the inner surface of bottom wall 38, and each pair of ridges defines a channel 50 therebetween. These ridges and channels are in alignment with corresponding ridges 20 and channels 21 in the upper housing shell, and they provide support and guidance for the monocular telescopes to be slidably fitted within the housing.

Each sidewall 39 has an upwardly extending lip 52 which fits against the inner surface of side wall 17 of the upper shell when the housing is assembled. A pair of tabs 53 having holes 53A extend from lips 52 adjacent rear wall 41. A pair of grooves 54 are formed adjacent the forward edge of lower shell 13 in alignment with corresponding grooves 22 in the upper shell. The grooves have inwardly beveled forward peripheral edges 55. Grooves 54 receive and support eyepiece shields 32 when the upper and lower housing shells are assembled.

Center wall 40 has a central semi-circular opening 56 with an index notch 57. Opening 56 is in alignment with opening 27 in the upper shell to form a circular opening through the assembled housing to receive an interpupillary-spacing adjustment hub described below. A pair of openings 59 extend through the center wall on opposite sides of semicircular opening 56, and a pair of sockets 60 extend into the upper end of the center wall on opposite sides of opening 56. Sockets 60 receive locating pins 30 of the upper shell when the housing is assembled. The upper and lower housing shells are secured together by screws passing through openings 59 and threaded into holes 29A in tabs 29, and also by carrying-strap anchor screws (not shown) passing through holes 35 and 53A in the upper and lower shells.

Brow bar 14 (FIGS. 1, 11 and 12) has a rear wall 63 with a pair of forwardly extending sidewalls 64 and upper and lower forwardly extending lips 65 and 66 extending between the sidewalls along the edges of rear wall 63. As best seen in FIG. 11, lower lip 66 is contoured to fit against the forehead of the user when the binocular is in use as explained below. A pair of detent buttons 67 and 68 extend from the inner surface of one of sidewalls 64, and a socket 69 is formed in each sidewall 64 to receive pins 33 on eyepiece shield 32 of the upper housing shell.

When the outer housing is assembled, sidewalls 64 of brow bar 14 (which is made of a slightly resilient plastic material) are urged apart until the sidewalls can be slipped over pins 33 on eyepiece shield 32 of upper housing shell 12. Sidewalls 64 are then released so pins 33 seat in socket 69, and these mated parts provide a pair of hinges so the brow bar can be pivotally moved with respect to the upper housing shell. The brow bar is held in either an open viewing position (FIG. 3) or a closed storage position (FIG. 1) by detent buttons 67 and 68 respectively, which seat in detent socket 34 in eyepiece shield 32 of the upper housing shell.

Preferably, the housing components described above are injection molded, and are formed from a plastic material such as fiberglass-filled ABS resin. This material provides a strong, rugged outer housing for the binocular, and eliminates the need for a conventional case.

The optical components of the binocular are arranged in a pair of monocular telescopes 72A and 72B supported within outer housing 11. Telescopes 72A and 72B are substantially identical, with the exception of an eyepiece focusing mechanism to be described below. Telescope 72A is shown in detail in FIGS. 13–18, and the following description of this unit also applies to telescope 72B.

Telescope 72 includes a skeletal frame 75 having a central prism-supporting platform or base 76 which extends generally perpendicularly to the optical axis of the telescope. A hollow tapered objective lens housing 77 extends forwardly from the front face of base 76 adjacent the outer end thereof. A conventional objective lens 78 (shown in phantom in FIG. 14) is mounted at the forward end of housing 77, and is secured in place by a conventional locking ring (not shown). A stiffening web 79 extends between base 76 and housing 77.

A hollow eyepiece tube 80 extends rearwardly from a generally central part of the rear face of base 76. A biconvex field lens 81 (shown in phantom in FIG. 14) is supported in a cell 82 which makes a slip fit within eyepiece tube 80. A conventional achromatic eyepiece lens 83 is supported in a cell 84 threaded into the rear end of eyepiece tube 80. In this Kellner-type optical system, focusing of the ocular system is achieved by moving field lens 81 axially along eyepiece tube 80 as described below, rather than by moving eyepiece lens 83 axially along the tube.

A straight slot 86 is cut through a portion of the periphery of eyepiece tube 80, and the slot lies in a plane generally perpendicular to the axis of the tube. A sloping groove 87 is formed in the outer surface of field-lens cell 82 beneath slot 86. A focus-adjusting ring 88 (FIGS. 3 and 14) having a knob 89 extending radially therefrom, makes a rotatable slip fit around eyepiece tube 80. A pin 90 (FIG. 14) is rigidly secured to the inner surface of a tab 91 secured to and extending forwardly from ring 88, and the pin extends through slot 86 to seat in a sloping groove 87 of the field-lens cell.

Rotation of focus-adjusting ring 88 drives the field lens axially along eyepiece tube 80 to focus the telescope. Preferably, sloping groove 87 is relatively steep to provide a rapid focus adjustment for the binocular as described in detail in U.S. Pat. No. 3,540,792 titled "Rapid-Focus Binocular".

Figure 14:
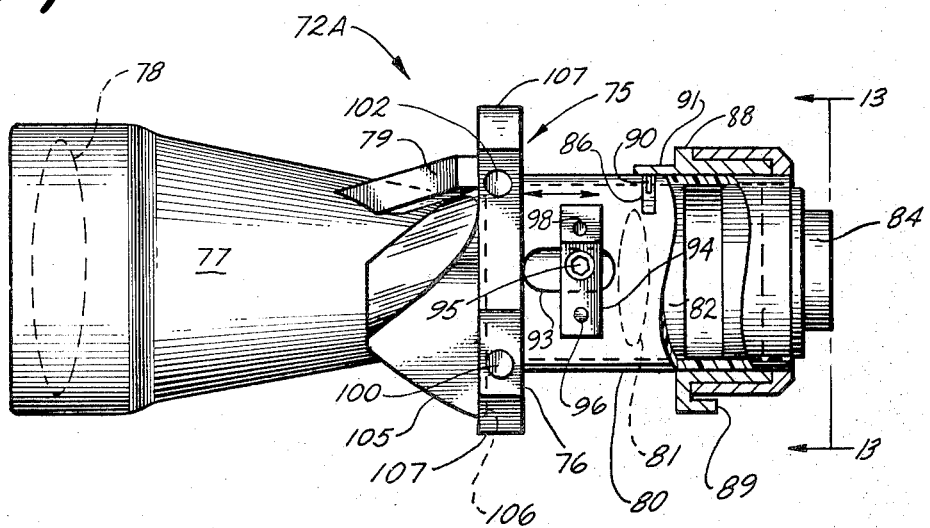
FIG. 14 is a side elevation showing the inwardly facing surfaces of the telescope.
Figure 18:
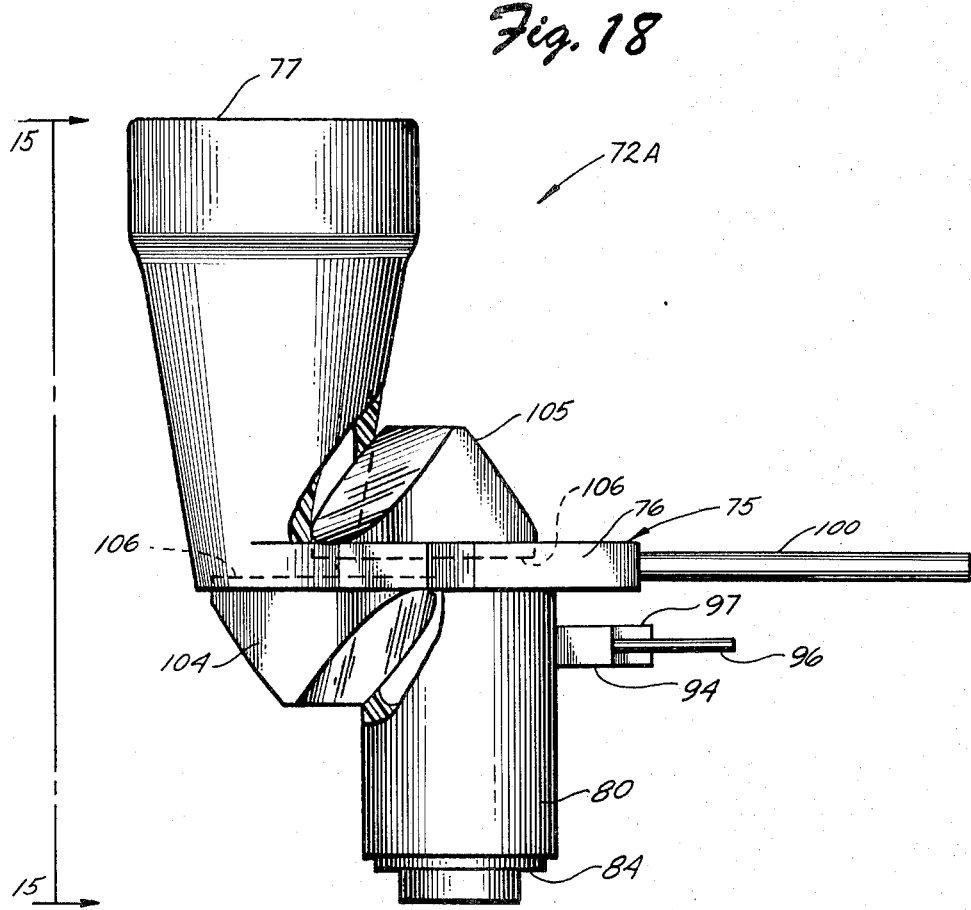
FIG. 18 is a bottom view of the telescope.
Figure 15:
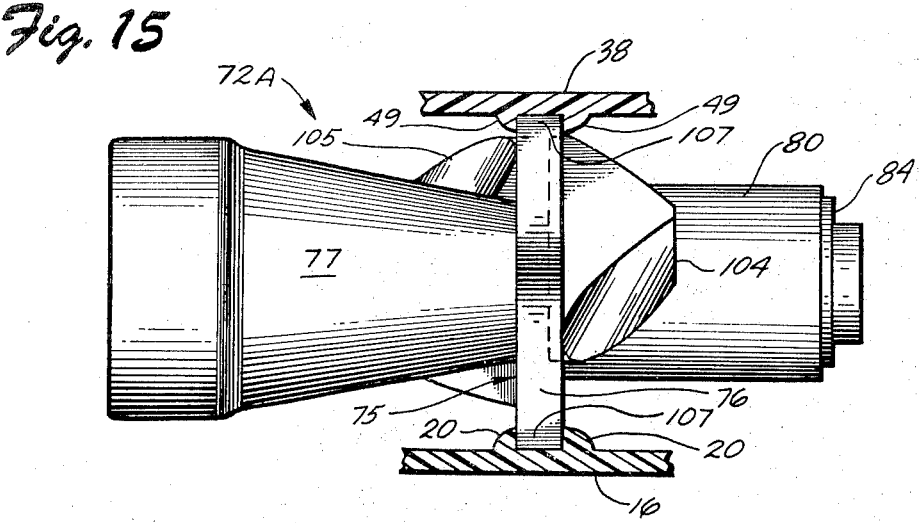
FIG. 15 is a side elevation showing the outwardly facing surfaces of the telescope.
Figure 17:
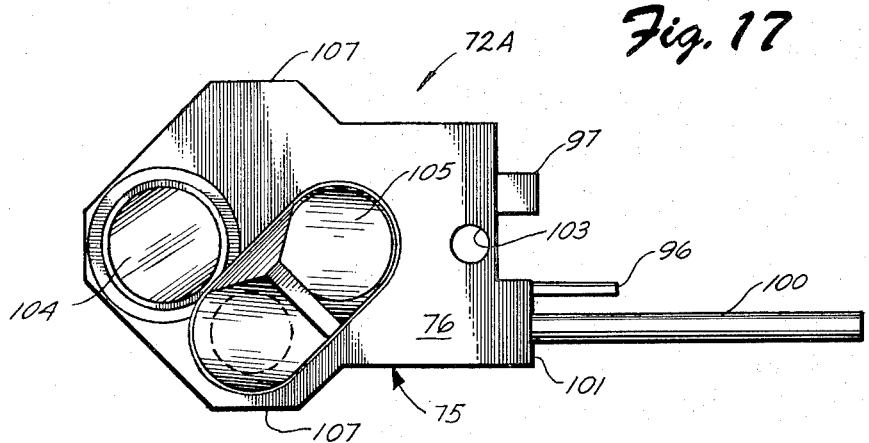
FIG. 17 is a front elevation of the telescope on line 17—17 of FIG. 16.
Figure 16:
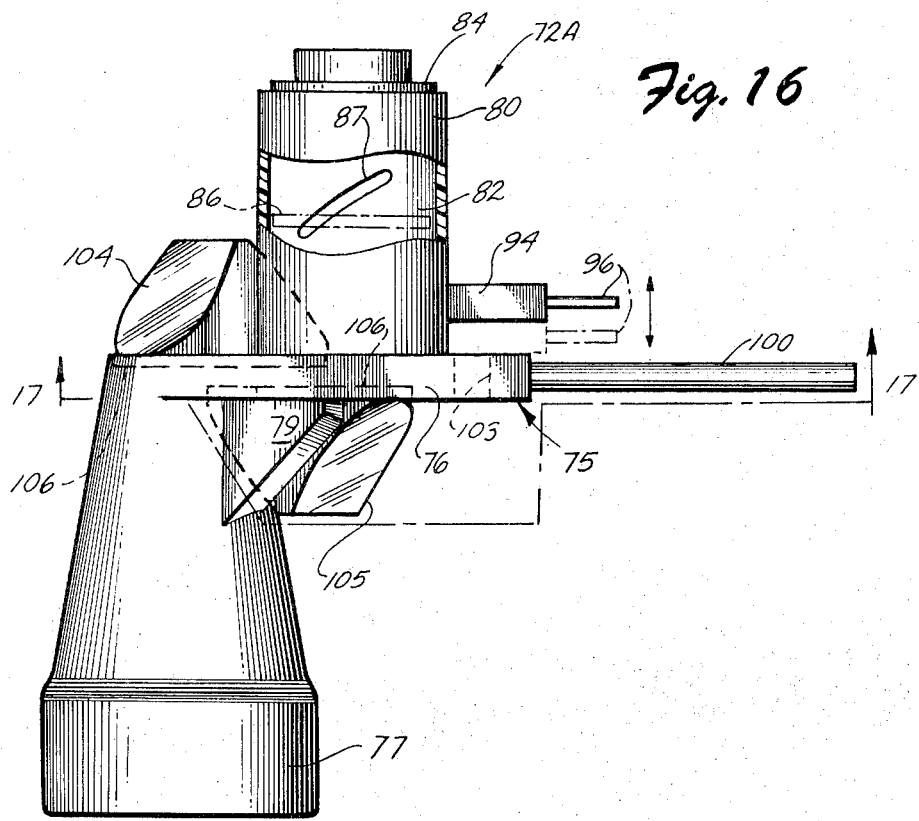
FIG. 16 is a top view of the telescope.

An axially extending slot 93 is cut through the inner side of eyepiece tube 80 adjacent base 76. A bridge member 94 is positioned adjacent the eyepiece tube over slot 93, and the bridge member is rigidly secured to field-lens cell 82 by a screw 95 (FIG. 14). Bridge member 94 thus moves with field-lens cell 82 along the outer surface of the eyepiece tube during focusing adjustment.

A coupling pin 96 is rigidly secured to bridge member 94, and extends inwardly from an inner surface of the bridge member. An inwardly extending portion 97 of the bridge member defines a socket 98. A similar coupling arrangement is provided on base 76 of the skeletal frame, including a coupling pin 100 rigidly secured to an inwardly extending portion 101 of the base, and a socket 102 extending into the base and generally parallel to the coupling pin. A bore 103 (FIG. 17) extends through base 76 adjacent portion 101, and defines a socket opening to receive a crank pin described below.

A pair of conventional prisms 104 and 105 are seated and cemented in recesses 106 on opposite sides of base 76. If desired, the prisms may also be secured in place by metal straps (not shown) extending between base 76 and the lens housings over the prisms. Prism 104 reflects light received from the objective lens to prism 105 which in turn redirects the light to pass through the field and eyepiece lenses in tube 80. Portions of the eyepiece tube and objective-lens housing are cut away adjacent base 76 to provide clearance for these prisms. Base 76 is enlarged in width adjacent the prisms to define a pair of guide rails 107 along the upper and lower edges of the base.

Binocular telescope 72B is identical to telescope 72A, with the exception that only telescope 72A includes a focus-adjusting ring 88. Another exception is that telescope 72B is equipped with a conventional dioptric-correction adjustment ring 110 (FIG. 3) to move the associated eyepiece lens within a limited range. When the binoculars are first used, telescope 72A is brought into sharp focus with focus-adjusting ring 88, and ring 110 is then rotated to compensate for optical differences between the user's eyes. Once this adjustment is individual further focusing is done simply by rotating ring 88.

Figure 19:
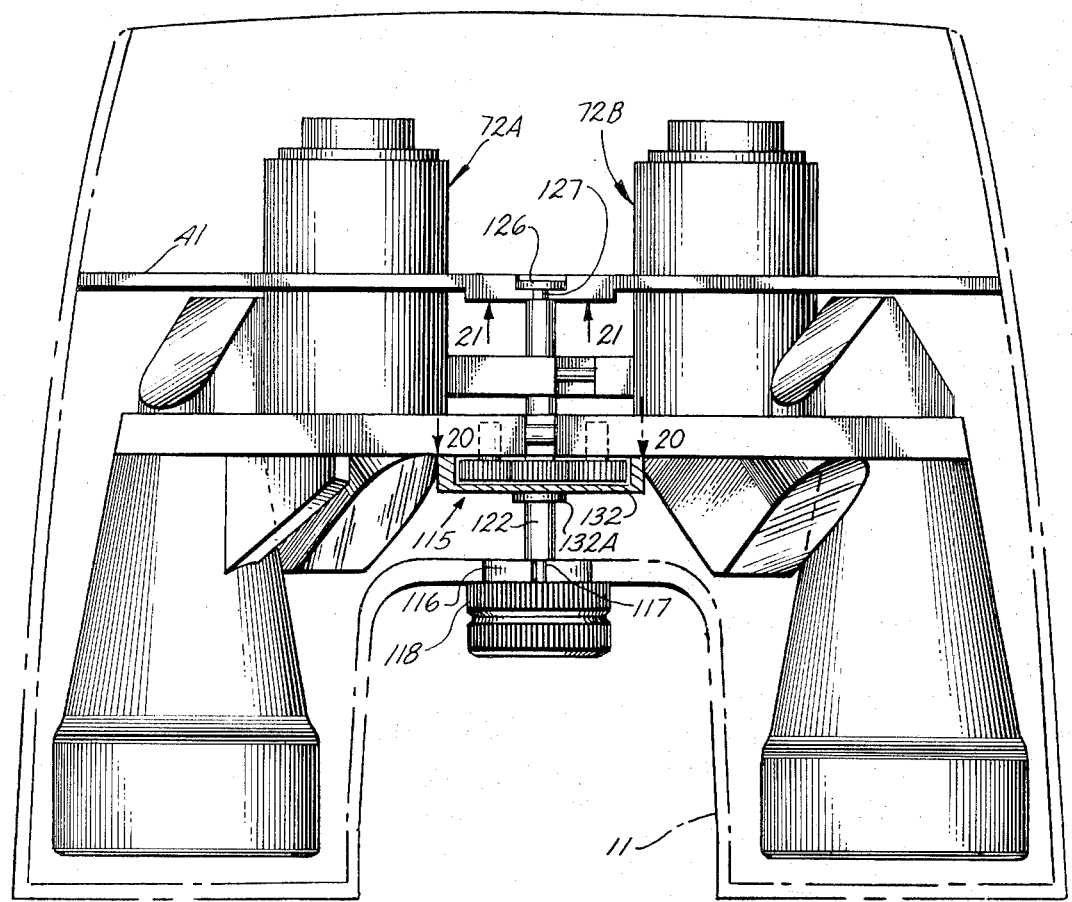
FIG. 19 is a plan view of a pair of assembled monocular telescopes with an interpupillary-spacing adjustment system, and showing a portion of the lower housing shell in solid line, and portions of the upper housing shell in phantom line.

After the optical components of each telescope are aligned, the two telescopes are fitted together by mating coupling pins 100 in sockets 102 and coupling pins 96 in sockets 98 as shown in FIG. 19. These pins make a slip fit in the associated sockets, permitting the lateral spacing of the two telescopes to be varied by urging the units together or apart. This adjustment is necessary to vary the interpupillary spacing of the eyepiece lenses to accommodate the binocular to the eye spacing of individual users.

An interpupillary-spacing adjustment means 115 (FIG. 19) is positioned between the two telescopes, and includes a stationary cylindrical hub 116 dimensioned to fit snugly in semi-circular openings 27 and 56 of the upper and lower housing shells. A pair of lugs 117 extend from opposite sides from hub 116 to mate with index notches 28 and 57 on the housing shells.

Lugs 117 lock hub 116 in place, and prevent the hub from rotating with respect to the housing shells. A hollow cylindrical shell 118 of enlarged diameter extends forwardly from the front face of hub 116, and a window 119 (FIG. 2) is formed through the undersurface of the shell.

A metal shaft 122 is journalled through a central opening in hub 116, and an outer end of the shaft is rigidly secured to a rotatable adjustment knob 123 positioned adjacent cylindrical shell 118. The adjustment knob has a rearwardly extending shank 124 which fits within shell 118. Numbers indicating various interpupillary spacings are positioned on the outer surface of shank 124 to be visible through window 119, permitting quick and simple adjustment of telescope spacing by the user.

Shaft 122 is sufficiently long to extend rearwardly to rear wall 41 of the lower housing shell (FIG. 19) when the binocular is assembled. The rear end of the shaft includes a disc 126 of enlarged diameter which fits into pocket 45 of rear wall 41. A shaft portion 127 of reduced diameter extends forwardly from the disc, and is journalled through opening 46 in boss 44 of the rear wall. Disc 126 is held captive in pocket 45 by a block 128 (FIG. 21) having a pocket and opening corresponding to pocket 45 and opening 46 of boss 44. Block 128 is secured in place by a pair of screws 129 threaded into openings 147 and boss 44.

Figure 20:
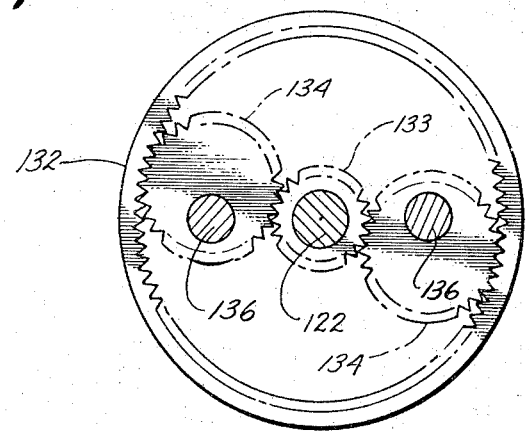
FIG. 20 is a view of a gear assembly on line 20—20 of FIG. 10.

An internal-tooth cup-shaped ring gear 132 (FIGS. 19 and 20) makes a rotatable slip fit over shaft 122 adjacent bases 76 of telescopes 72A and 72B. The ring gear is restrained axially by a C-ring retainer 132A fitted in a groove (not shown) in shaft 122. A central spur gear 133 is rigidly secured to shaft 122 centrally within the cup-shaped ring gear. A pair of planetary spur gears 134 are positioned on opposite sides of central spur gear 133, and the planetary gears mesh with gears 132 and 133.

Each planetary spur gear 134 has an off-axis crank pin 136 extending rearwardly therefrom. Each crank pin 136 makes a rotatable slip fit within bore 103 in base 76 of a respective telescope. Crank pins 136 are restrained against vertical movement by bases 76 which are similarly confined by the binocular housing, but the crank pins can increase or decrease in lateral separation because bases 76 of th two telescopes are free to slide laterally with respect to each other along coupling pins 100.

Final assembly of the binocular is completed by positioning the mated monocular telescopes and interpupillary adjustment means 115 within lower housing shell 13 as shown in FIG. 19. Hub 116 of the interpupillary adjustment means is seated in semicircular opening 56 of the lower housing shell, and disc 126 of shaft 122 is seated in pocket 45 of the shell as described above. The shaft disc is locked in place by securing block 128 to boss 44 as previously mentioned.

When the telescopes are thus positioned, guide rails 107 on the bottom of bases 76 of the two telescopes make a slip fit in channels 50 in the lower housing shell, and the ribs and channels cooperate to guide and control lateral movement of the telescopes during interpupillary-spacing adjustment. Eyepiece tubes 80 extend through oblong eyepiece openings 42 in rear wall 41 of the lower housing shell, and the oblong openings provide clearance for lateral movement of the eyepiece tubes during adjustment of interpupillary spacing.

A pair of cover panels 140 (FIG. 3) are fitted over the outer ends of eyepiece tubes 80 against the rear surface of rear wall 41 to cover eyepiece openings 42. The cover panels are rigidly secured to the eyepiece tubes, and move with the tubes during interpupillary-spacing adjustment. Adjusting rings 88 and 110 are then secured to the respective eyepiece tubes.

Upper housing shell 12 is then mated with lower shell 13, and the parts are guided together by locating pins 30 which fit into sockets 60 in the lower shell. The upper and lower shells are secured together by a pair of screws 142 (FIG. 4) extending through openings 59 and threaded into openings 29A of the upper shell. Brow bar 14 is also fitted onto upper shell 12 as described above if this step has not already been accomplished.

When the binoculars are not in use, brow bar 14 is left in a closed position (as shown in solid line in FIG. 1) to protect the eyepiece lenses. Objective cover panels 24 normally provide adequate protection for the objective lenses of the binocular, but additional protection may be provided if desired by adding a pair of removable cover plates 145 as shown in FIGS. 22 and 23. These plates are formed as flat panels with a perimeter corresponding to the contour of the forward end of the binocular housing. A plurality of integral lugs 146 extend slightly from the rear face of each cover plate, and an outwardly facing surface 147 of each lug is beveled to mate with beveled surfaces 23 and 55 of the upper and lower shells. Cover plates 145 are removed when the binocular is to be used simply by twisting the panel slightly to disengage lugs 146 from the housing as suggested in FIG. 4.

In use, brow bar 14 is hinged upwardly to the position shown in FIG. 3, and the contoured lip of the brow bar is positioned against the user's forehead to steady the binocular. If adjustment of interpupillary spacing of the telescopes is required, adjusting knob 123 is rotated until a satisfactory spacing is achieved.

Telescope 72A is then focused by rotating focus-adjustment ring 88 until a sharp image is obtained. The field lenses of both telescopes are moved axially during this adjustment because the field-lens cells are coupled together by bridge members 94 which are in turn mated together by coupling pins 96. The bridge members slide on the respective coupling pins to permit lateral separation of the members during adjustment of interpupillary spacing.

There has been described a novel binocular which is characterized by a skeletal internal construction housed in outer shell which eliminates the need for a conventional case. Substantially identical monocular telescopes are used, with a resulting simplification in tooling and assembly procedures. Use of identical telescopes results in opposite positioning of the respective prisms within the binocular housing (see FIG. 19), but this does not affect optical quality of the instrument. Alignment procedures are also simplified by eliminating movement of telescopes with respect to each other, and by accomplishing the interpupillary-spacing adjustment by a linear-hinge arrangement which preferably incorporates the planetary-gear system described above, but rack-and-pinion gears or other lateral spacing adjustments can also be used.

What is claimed is:

1. A binocular for viewing distant objects, comprising a pair of monocular telescopes adapted for viewing of distant objects, each telescope including a frame having a prism-supporting base, a pair of open Porro prisms mounted on opposite sides of the base to be accessible for adjustment when the monocular telescope is accessible, eyepiece and objective-lens housings extending from opposite sides of the base, and eyepiece and objective lenses supported in the respective housings;

coupling means connecting the two telescopes to be laterally movable with respect to each other for adjustment of interpupillary spacing; and a fixed-shape non-extensible outer housing fitted over both telescopes to enclose the open prisms, the housing including guide means engaged with the telescopes and permitting lateral movement of the telescopes within the stationary housing during adjustment of interpupillary spacing.

2. The binocular defined in claim 1 wherein the two frames are substantially identical and oppositely positioned within the housing, and wherein the interpupillary spacing lateral movement of the telescopes is a linear straight-line motion.

3. The binocular defined in claim 2 wherein the coupling means includes a pair of coupling pins, each pin being secured to a respective frame and making a slip fit in a socket in the other frame, the coupling means further having adjustment means for varying the lateral spacing of the telescopes, each telescope having an optical system which includes a field lens, the field lens being axially movably mounted in the eyepiece housing for telescope focusing.

4. The binocular defined in claim 3 wherein each eyepiece housing has an axially extending slot therethrough adjacent the field lens, and further comprising a pair of bridge members each secured to a respective field lens through the slot, and means connecting the bridge members to be laterally movable with respect to each other during interpupillary-spacing adjustment, and to constrain the bridge members to move axially together whereby the telescopes can be focused simultaneously.

5. The binocular defined in claim 4 and further comprising a focus ring rotatably mounted on one eyepiece housing, and coupled to the associated field lens to drive the lens axially along the eyepiece housing.

6. The binocular defined in claim 5 and further comprising a unitary eyepiece cover pivotally mounted on the housing to be movable between storage and viewing positions, the cover extending over rear ends of the eyepiece housings in the closed position, and having an anatomically contoured rim adapted to rest against the user's forehead when the cover is in the viewing position.

7. The binocular defined in claim 1 wherein the outer housing comprises upper and lower shells which are interfitted to enclose the frame bases and objective-lens housings, one of the shells having a rear wall with a pair of elongated openings through which the eyepiece housings extend.

8. The binocular defined in claim 7 and further comprising an eyepiece cover pivotally secured to the housing to cover the eyepiece lenses in a storage position, the cover being pivotally movable away from the eyepiece lenses to a viewing position when the binocular is in use.

9. The binocular defined in claim 8 in which the eyepiece cover is anatomically contoured to fit against the user's forehead when the cover is in the viewing position.

10. The binocular defined in claim 9 and further comprising detent means extending between the eyepiece cover and outer housing to index the cover into either of the storage and viewing positions.

11. The binocular defined in claim 7 wherein the outer housing includes a pair of transparent cover panels extending over the objective lenses.

12. The binocular defined in claim 11 and further comprising a pair of closure panels removably engaged with the housing over the transparent objective-lens cover panels.

13. The binocular defined in claim 1 wherein said guide means comprises means forming a plurality of channels on the inner surface of the housing, each base defining guide ribs fitting into and slidably movable along the channels.

* * * * *

8577
PO-1050
(5/69)

UNITED STATES PATENT OFFICE
CERTIFICATE OF CORRECTION

Patent No. 3,829,194      Dated  August 13, 1974

Inventor(s)  Gerrit A. Van Exel and Alfred A. Akin, Jr.

It is certified that error appears in the above-identified patent and that said Letters Patent are hereby corrected as shown below:

```
In the Abstract, "singed" should read -- hinged --.
Column 1, line 29, "acessible" should read -- accessible --.
Column 2, line 57, after "is" insert -- an --.
Column 3, line 11, "wall" should read -- walls --;
          line 49, "Boss 45" should read -- Boss 44 --.
Column 5, line 20, before "sloping", delete "a".
Column 6, line 4, "individual" should read -- made --;
          line 51, "147" should read -- 47 --.
Column 7, line 1, "th" should read -- the --.
Column 8, line 6, after "in" insert -- an --.
```

Signed and sealed this 31st day of December 1974.

(SEAL)
Attest:

McCOY M. GIBSON JR.
Attesting Officer

C. MARSHALL DANN
Commissioner of Patents